June 14, 1938.  A. F. AVEY  2,120,596
TELESCREEN
Filed April 28, 1936  2 Sheets-Sheet 1
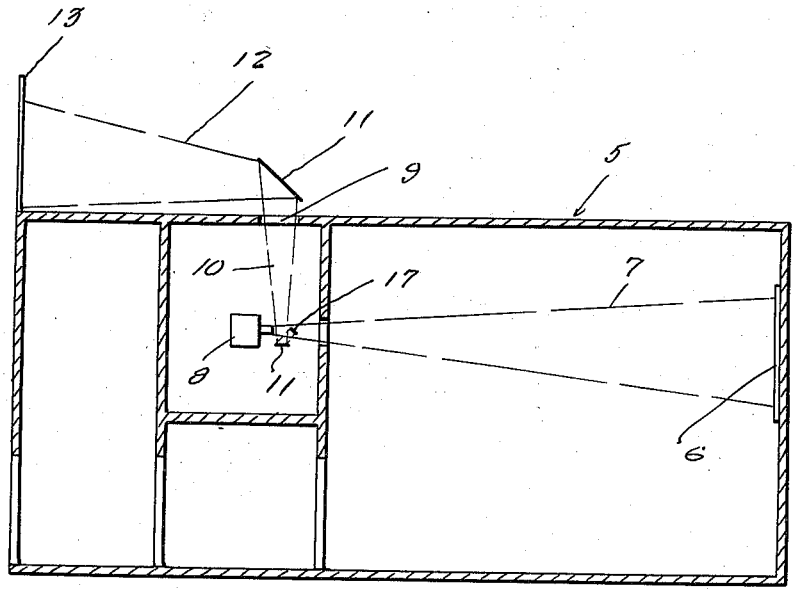
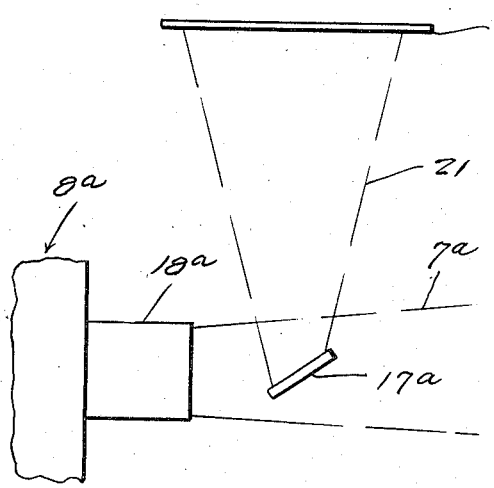
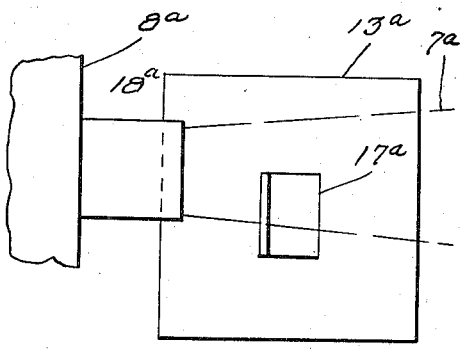
Inventor
Albert F. Avey
By Clarence A. O'Brien and
Hyman Berman
Attorneys June 14, 1938.  A. F. AVEY  2,120,596
TELESCREEN
Filed April 28, 1936   2 Sheets-Sheet 2
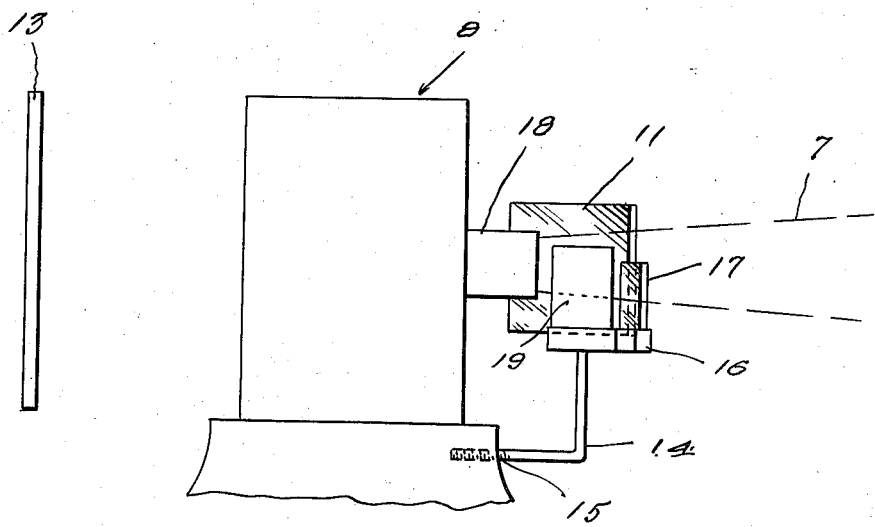
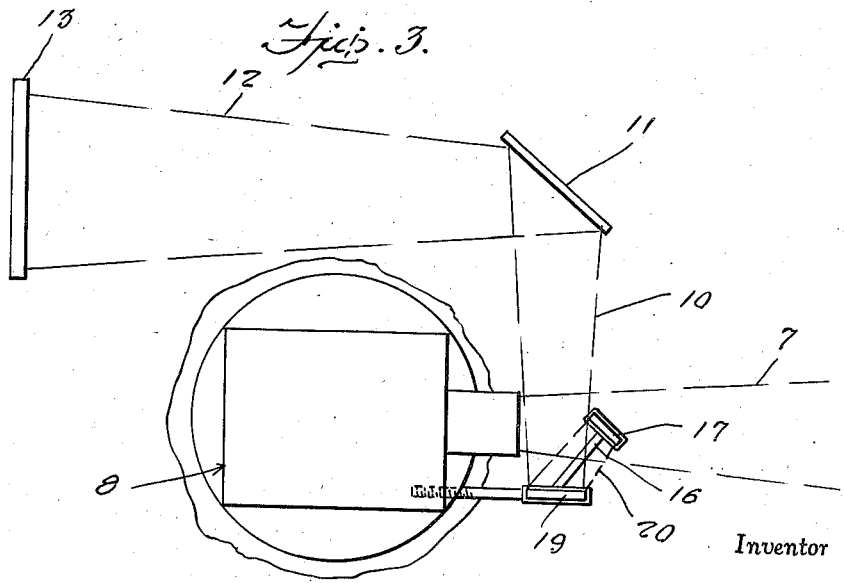
Inventor
Albert F. Avey
By Clarence A. O'Brien and
Hyman Berman
Attorneys Patented June 14, 1938

2,120,596

UNITED STATES PATENT OFFICE 2,120,596

TELESCREEN

Albert Franklin Avey, Vienna, Ga.

Application April 28, 1936, Serial No. 76,871

3 Claims. (Cl. 88—24)

My invention relates generally to means employed in connection with a moving picture projector in a theatre or the like for showing at a remote place a portion or all of the subject being projected while the projector is in operation and is showing the "picture" on the screen of the theatre or the like, and an important object of my invention is to provide a simple and efficient arrangement of this character whereby all or portions of the moving picture being exhibited in the theatre or the like may be exhibited at the exterior of the theatre as an advertising means, and for other purposes.

Another important object of my invention is to provide a simpler, more efficient, and more easily maintained and operated arrangement of the character indicated above, so that devices of this character will be available more generally for advertising and attention attracting use.

Other important objects of my invention will be apparent from a reading of the following description in connection with the drawings, wherein for purposes of illustration I have shown preferred embodiments of my invention.

In the drawings:—

Figure 1 is a general horizontal sectional view taken through a theatre or exhibition hall and showing a moving picture projector exhibiting a picture on the screen of the hall and with the invention applied thereto and exhibiting the moving picture on a reduced or full scale at the front or side of the theatre or hall.

Figure 2 is a general side elevational view showing portions of one embodiment of the invention applied in connection with the moving picture projector.

Figure 3 is a top plan view of Figure 2, showing the course of the various light-beams transmitted in the projection and in the action of the telescreen.

Figure 4 is a top plan view similar to Figure 3 of another embodiment of the invention wherein the image on the screen is erect but reversed.

Figure 5 is a side elevational view of Figure 4.

Referring in detail to the drawings, the numeral 5 generally designates a suitable exhibition enclosure having the moving picture screen 6 upon which impinge the light rays 7 effectively projected from the projector 8. The numeral 9 designates an opening in the side or other suitable part of the enclosure 5 through which the light rays 10 coming from the direction of the projector 8 pass to impinge upon the mirror 11 and be reflected as indicated by the numeral 12 onto the telescreen 13 which is outside of the exhibition enclosure and whereon the image which is projected by reason of the presence of the mirror 11 and another mirror to be described in the line of travel on the light rays, is erect and vertical.

The means for deflecting a portion of the light rays 7 ordinarily issuing from the projector consists of a suitable bracket 14 shown clearly in Figure 2 as fixed in some suitable manner as indicated by the numeral 15 to the projector which is generally designated 8 and supporting bracket means 16 from which rises the mirror 17. The small opaque mirror 17 rises only until its upper edge is on the axis of the light beam 7, and the mirror 17 is only about half as wide as the aperture of the projector lens arrangement 18, so as to permit the uninterrupted portions of the light beam 7 to pass over and around the mirror 17. The bracket 16 also holds in a forty-five degree angle relative to the mirror 17 another enlarged mirror 19 which reflects the rays 20 across the path of the beam 7 and onto a third mirror 11 which is arranged at a suitable angle to reflect the rays impinged thereon to the front of the telescreen 13 as clearly shown in Figure 3. The "picture" is to be seen from the right-hand side of the telescreen 13.

In the embodiment of the invention which is shown in Figures 4 and 5 a single small mirror 17a is supported within the beam 7a proceeding from the lens structure 18a of the projector 8a and is proportioned and arranged similarly to the reflector 17 and is angulated at a suitable angle to reflect a beam 21 onto the back of the telescreen 13a, the telescreen 13a being translucent so that the "picture" may be seen only on the back side or outer side as shown in Figure 4. The picture is erect but reversed on the outer side of the telescreen 13a.

Although I have shown and described herein preferred embodiments of my invention, it is to be definitely understood that I do not desire to limit the application of the invention thereto, and any change or changes may be made in the materials, and in the structure and arrangement of the parts, within the spirit of the invention and the scope of the subjoined claims.

What is claimed is:—

1. In combination, a projector including projecting lens structure, a duplex bracket mounted on said projector adjacent said lens structure, said duplex bracket comprising a first portion extending approximately parallel to a projection light beam issuing from said lens structure, and a second portion extending at an acute angle to said first portion and partly across the axis of said light beam, a relatively small mirror mounted on said second portion and extending into said light beam, a relatively large mirror mounted on said first portion in receiving relation to the light rays reflected from said relatively small mirror.

2. In combination, a projector including projecting lens structure, a duplex bracket mounted on said projector adjacent said lens structure, said duplex bracket comprising a first portion extending approximately parallel to a projection light beam issuing from said lens structure, and a second portion extending at an acute angle to said first portion and partly across the axis of said light beam, a relatively small mirror mounted on said second portion and extending into said light beam approximately as far as the axis of said light beam, a relatively large mirror mounted on said first portion in receiving relation to the light rays reflected from said relatively small mirror, said relatively small mirror being opaque and of a transverse dimension less than the diameter of said projection light beam.

3. In combination, a projector including projecting lens structure, a duplex bracket mounted on said projector adjacent said lens structure, and duplex bracket comprising a first portion extending approximately parallel to a projection light beam issuing from said lens structure, and a second portion extending at an acute angle to said first portion and partly across the axis of said light beam, a relatively small mirror mounted on said second portion and extending into said light beam approximately as far as the axis of said light beam, a relatively large mirror mounted on said first portion in receiving relation to the light rays reflected from said relatively small mirror, said relatively small mirror being opaque and of a transverse dimension less than the diameter of said projection light beam, said relatively large mirror having a transverse dimension approximating the diameter of the projection light beam, said relatively large mirror being arranged to reflect the light rays from said small mirror through the said projection light beam.

ALBERT FRANKLIN AVEY.